(12) United States Patent
Miyahara

(10) Patent No.: US 9,288,352 B2
(45) Date of Patent: Mar. 15, 2016

(54) PRINTING APPARATUS THAT PRINTS AN IMAGE ON AN ENVELOPE

(71) Applicant: CANON KABUSHIKI KAISHA, Tokyo (JP)

(72) Inventor: Nobuaki Miyahara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/336,358

(22) Filed: Jul. 21, 2014

(65) Prior Publication Data
US 2015/0029521 A1    Jan. 29, 2015

(30) Foreign Application Priority Data

Jul. 24, 2013  (JP) .................................. 2013-153614

(51) Int. Cl.
| | | |
|---|---|---|
| G06F 15/00 | (2006.01) | |
| G06K 1/00 | (2006.01) | |
| G06K 15/10 | (2006.01) | |
| H04N 1/00 | (2006.01) | |
| B41J 13/12 | (2006.01) | |
| B41J 11/00 | (2006.01) | |
| H04N 1/23 | (2006.01) | |

(52) U.S. Cl.
CPC ........... *H04N 1/00663* (2013.01); *B41J 11/008* (2013.01); *B41J 13/12* (2013.01); *H04N 1/00482* (2013.01); *H04N 1/2323* (2013.01); *H04N 1/2338* (2013.01); *H04N 1/2384* (2013.01); *H04N 1/00435* (2013.01); *H04N 2201/0082* (2013.01); *H04N 2201/0094* (2013.01)

(58) Field of Classification Search
CPC .......... H04N 1/00663; H04N 1/00435; H04N 1/2323; H04N 1/2338; H04N 1/2384; H04N 2201/0082; H04N 2201/0094; B41J 13/12; B41J 11/008

USPC .......................................... 358/1.1, 1.5, 1.18
See application file for complete search history.

(56) References Cited

U.S. PATENT DOCUMENTS

| | | | |
|---|---|---|---|
| 8,636,273 B2* | 1/2014 | Saito | 271/2 |
| 8,777,207 B2* | 7/2014 | Nishiyama | 271/2 |
| 2013/0168918 A1 | 7/2013 | Yap et al. | |
| 2013/0333330 A1* | 12/2013 | Batzer et al. | 53/460 |

FOREIGN PATENT DOCUMENTS

| | | |
|---|---|---|
| CN | 1180333 A | 4/1998 |
| CN | 2506457 Y | 8/2002 |
| CN | 201151240 Y | 11/2008 |
| CN | 103129173 A | 6/2013 |
| JP | 2005-56001 A | 3/2005 |
| JP | 2009-143682 A | 7/2009 |

\* cited by examiner

*Primary Examiner* — Douglas Tran
(74) *Attorney, Agent, or Firm* — Canon U.S.A., Inc. IP Division

(57) ABSTRACT

A printing apparatus prints an image in a right direction based on an open/close state of a flap of a held envelope and on a position of the flap received from a user. A control method for controlling a printing apparatus, includes determining whether an envelope having a flap is held by a holding unit with its flap opened or the envelope is held by the holding unit with its flap closed, receiving, from a user, a front end, a far side, or a back end in the conveyance direction of the envelope as a position of the flap of the envelope held by the holding unit, and performing control such that a direction of an image to be printed on the envelope is decided based on a result of the determination and on the received position of the flap, and the image is printed on the envelope.

7 Claims, 17 Drawing Sheets

100 MFP

FIG.8

< ENVELOPE SETTING >

- SHEET SIZE    332 mm × 240 mm
- WEIGHT    1003  210 g/m²
- FLAP POSITION    FRONT    FAR    BACK
                    1004    1005   1006

CANCEL          NEXT
1010            1011

FIG.15

< ENVELOPE SETTING >

- SHEET SIZE    332 mm × 240 mm
- WEIGHT    1003   210 g/m²
- FLAP SIZE    20.0 mm
  (SET 0 WHEN CLOSING FLAP.)

CANCEL    NEXT

PRINTING APPARATUS THAT PRINTS AN IMAGE ON AN ENVELOPE

BACKGROUND OF THE INVENTION

1. Field of the Invention

The present invention relates to a printing apparatus printing an image onto an envelope, a control method of the printing apparatus, and a storage medium.

2. Description of the Related Art

There has conventionally been known a printing apparatus that feeds an envelope set in a sheet storage portion such as a manual feed tray and prints an image onto the fed envelope (see Japanese Patent Application Laid-Open No. 2005-56001). An envelope has a projecting portion, which is referred to as a flap and which can be opened and closed, as illustrated in FIG. 17A. In a conventional printing apparatus, an envelope is set on a sheet storage portion with a flap thereof being located at the back end in a conveyance direction as illustrated in FIG. 17B. Such setting prevents an occurrence of a jam caused by the envelope whose flap is stuck in the printing apparatus.

In the related art, a method for setting an envelope is only one in which an envelope is set with its flap opened and with its flap located at the back end in the conveyance direction. Therefore, an image cannot be printed in a right direction on an envelope which is set in another way.

For example, some commercially available envelopes are sold with their flaps opened, and some are sold with their flaps closed. When a user purchases an envelope with its flap closed, and sets this envelope such that its flap is located on the back end in the conveyance direction as in the conventional way, the tip end of the closed flap is stuck in a conveyance path after the start of the printing operation, so that a jam is likely to occur. Therefore, when an envelope with its flap closed is set and an image is printed on this envelope, the envelope is preferably set with its flap located at a front end in the conveyance direction.

However, in this case, the position of the flap of the envelope set with the flap closed is opposite to the position of the flap of the envelope set with the flap opened. Therefore, when an image is printed on the envelope in the same manner as in the conventional way, the direction of the image printed on the envelope is incorrect.

A method for setting an envelope is also considered in which an envelope illustrated in FIG. 17B is set on a manual feed tray with its flap rotated at 90 degrees in a counterclockwise direction. In this case, when an image is printed on the envelope in the same manner as in the conventional way, the direction of the image printed on the envelope is also incorrect.

SUMMARY OF THE INVENTION

A printing apparatus according to an exemplary embodiment of the present invention includes a holding unit configured to hold an envelope having a flap, a determining unit configured to determine whether the holding unit holds the envelope with its flap opened or the holding unit holds the envelope with its flap closed, a receiving unit configured to receive, from a user, a position of the flap of the envelope held by the holding unit, and a control unit configured to perform control such that a direction of an image to be printed on the envelope is decided based on a result of the determination by the determining unit and on the position of the flap received by the receiving unit and the image is printed on the envelope in the decided direction.

Further features of the present invention will become apparent from the following description of exemplary embodiments with reference to the attached drawings.

BRIEF DESCRIPTION OF THE DRAWINGS

FIG. 8 is a view illustrating the operation screen according to the first exemplary embodiment.

FIG. 15 is a view illustrating an operation screen according to the second exemplary embodiment.

DESCRIPTION OF THE EMBODIMENTS

Various exemplary embodiments, features, and aspects of the invention will be described in detail below with reference to the drawings.

Exemplary embodiments of the present invention will be described with reference to the drawings.

Figure 1:
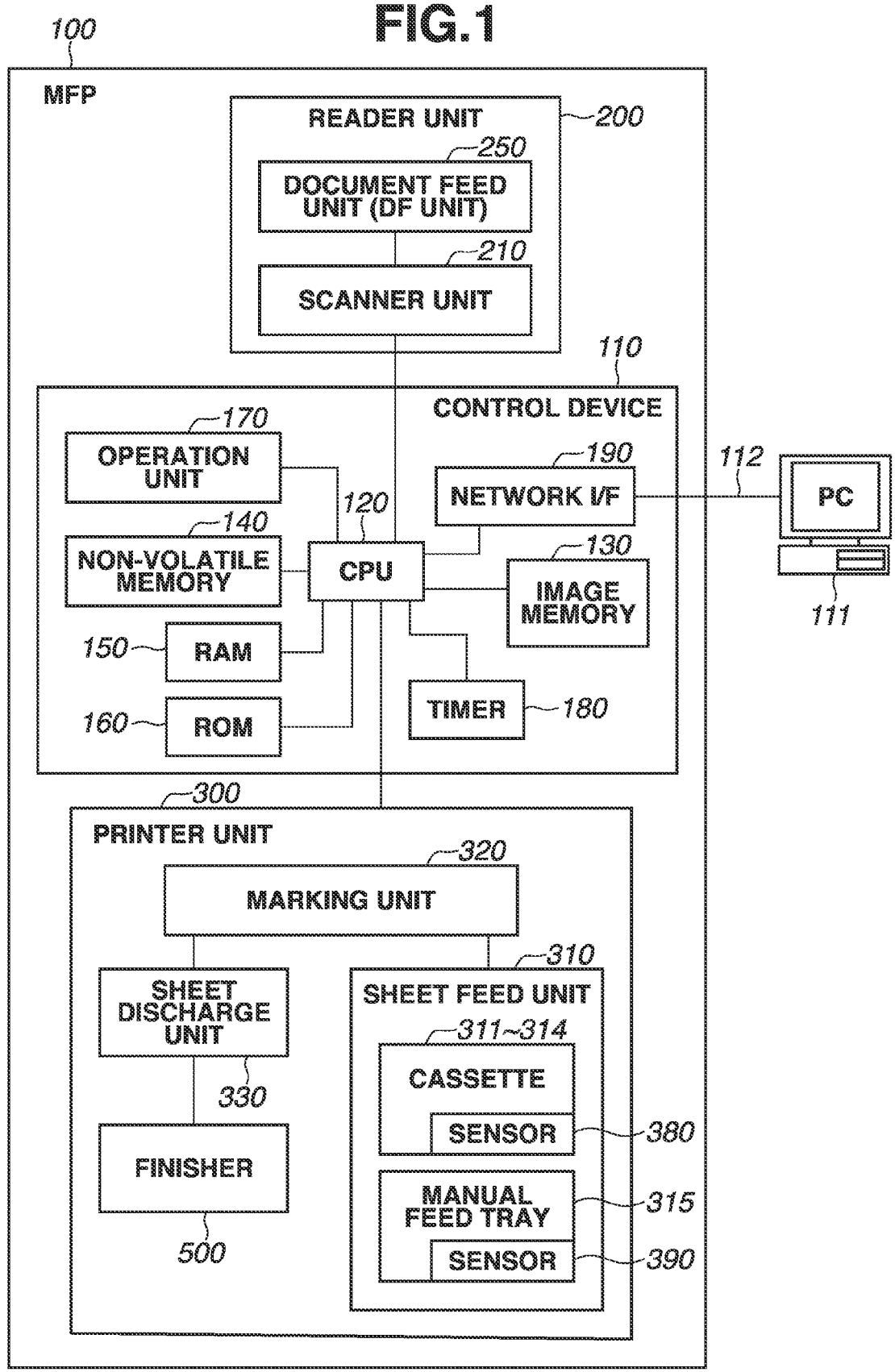
FIG. 1 is a block diagram illustrating a configuration of a printing system according to an exemplary embodiment.

FIG. 1 is a diagram illustrating a printing system according to a first exemplary embodiment. The printing system according to the present exemplary embodiment includes a personal computer (PC) 111 and a MFP 100.

The MFP 100 according to the present exemplary embodiment includes a control device 110, a reader unit 200, and a printer unit 300. In the present exemplary embodiment, the MFP will be given as an example. However, the printing system may be a single functional peripheral (SFP), so long as it has a printing function executed by the printer unit 300. The reader unit 200, the control device 110, and the printer unit 300 are electrically connected, and they transmit and receive a control command and data with one another. A finisher 500 can be connected to the MFP 100.

The control device 110 includes a central processing unit (CPU) 120, an image memory 130, a non-volatile memory 140, a random access memory (RAM) 150, a read only memory (ROM) 160, an operation unit 170, and a timer 180.

The CPU 120 reads a program stored in the ROM 160 on the RAM 150, and executes this program, thereby comprehensively controlling the MFP 100.

The RAM 150 functions as a work area of the CPU 120, and stores various programs and data.

The ROM 160 stores various programs read and executed by the CPU 120.

The image memory 130 stores image data. For example, the image memory 130 stores image data read by the reader unit 200. The image memory 130 also stores image data received from the PC 111. The image data stored in the image memory 130 is transmitted to the printer unit 300 in response to an instruction from the CPU 120.

The non-volatile memory 140 is a large-capacity memory that stores various programs and image data. In the present exemplary embodiment, a hard disk drive (HDD) will be given as an example of the non-volatile memory 140. However, any memory is useful, so long as it has a sufficient capacity for storing image data, such as Blu-ray disk.

The operation unit 170 includes a display unit and hard keys. The display unit includes a liquid crystal display unit and a touch panel sheet attached to the liquid crystal display unit. An operation screen or a condition of the MFP 100 is displayed on the liquid crystal display unit. The operation unit 170 receives the user's operation through the operation screen or the hard keys. All keys on the operation unit 170 may be soft keys.

The timer 180 is used to count time.

A network interface (I/F) 190 performs control in order that the MFP 100 communicates with an external device, such as the PC 111, via a network 112. In the present exemplary embodiment, the PC 111 will be given as an example of the external device. However, the external device may be other MFP, a portable terminal, or a facsimile device. In the present exemplary embodiment, an example will be given in which the MFP 100 and the external device are connected via the network 112. However, the MFP 100 may be connected to the external device via a universal serial bus (USB) cable. The MFP 100 and the external device can communicate with each other by radio communication.

The reader unit 200 includes a scanner unit 210 that reads an image of a document and generates image data indicating the read image, and a document feed unit (DF unit) 250 that feeds a document read by the scanner unit 210.

The printer unit 300 prints an image onto a sheet (recording sheet). The printer unit 300 feeds a sheet stored in a sheet feed unit 310 one by one, and conveys this sheet to a marking unit 320. The sheet feed unit 310 includes cassettes 311 to 314, and a manual feed tray 315. Each of the cassettes 311 to 314 includes a sensor for detecting whether a sheet is present in the corresponding cassette. The manual feed tray 315 also includes a sensor for detecting whether a sheet is set on the manual feed tray 315.

The marking unit 320 prints an image onto the fed sheet based on the image data transmitted from the image memory 130. The printer unit 300 discharges the sheet having the image printed thereon to a sheet discharge unit 330. The marking unit 320 may employ electrophotographic system or ink jet system. The marking unit 320 may employ other systems, so long as an image can be printed.

Figure 2:
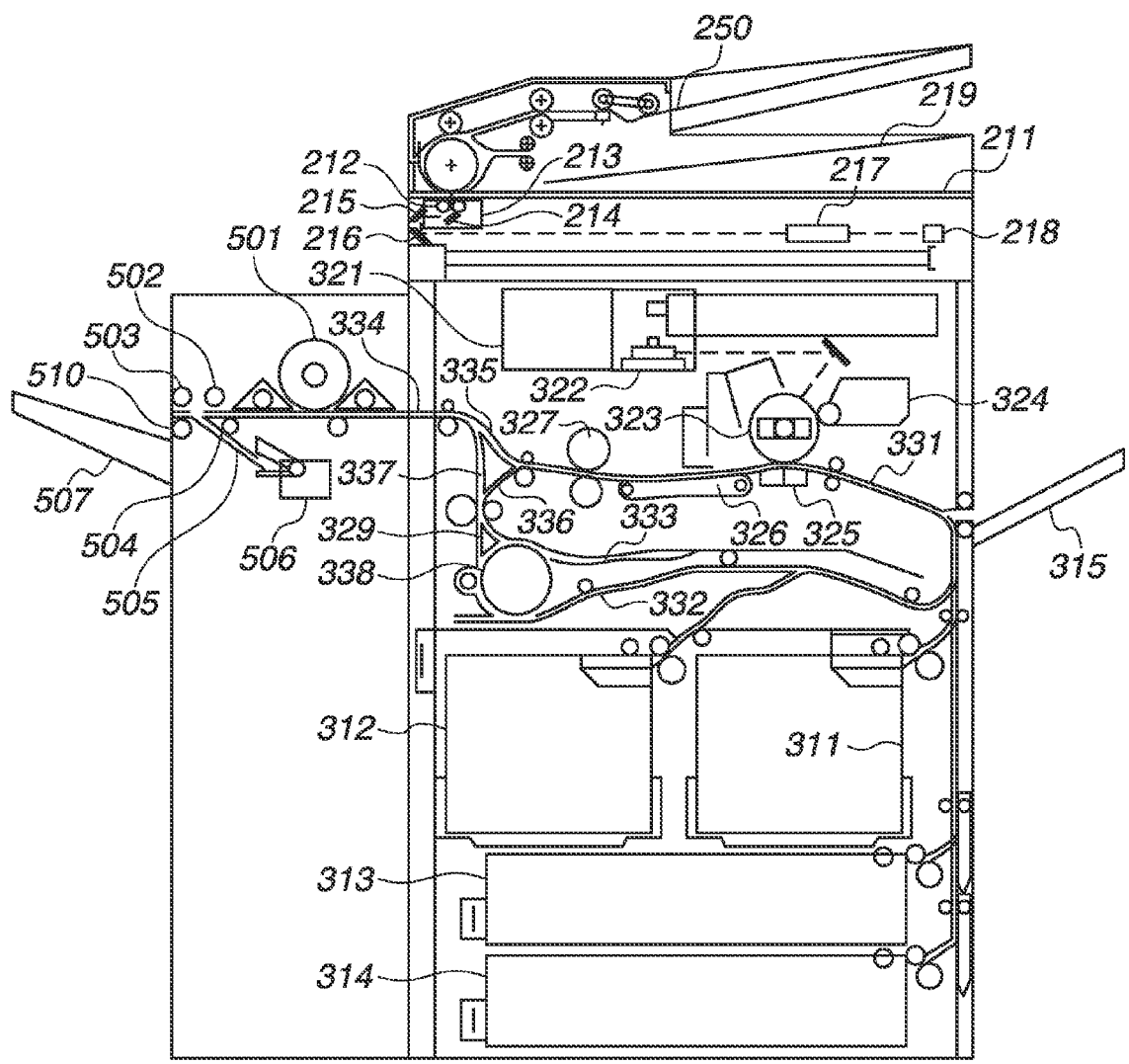
FIG. 2 a sectional view illustrating a configuration of a multi-function peripheral (MFP) according to the exemplary embodiment.

Next, the detail of the MFP 100 described with reference to FIG. 1 will be described with reference to FIG. 2.

The document feed unit 250 in the reader unit 200 feeds a document set on a document table one by one to an optical unit 213. The document conveyed to the optical unit 213 is discharged onto a discharge tray 219.

After the document is conveyed onto the optical unit 213, the reader unit 200 turns on a lamp 212, and exposes the document to light by the optical unit 213. In this case, reflection light from the document is guided to a charge coupled device (CCD) image sensor (hereinafter referred to as CCD) 218 by mirrors 214, 215, and 216 and a lens 217. An image of the document is read by the CCD 218. The image data output from the CCD 218 undergoes a predetermined process, and then, is transferred to the control device 110.

The reader unit 200 reads an image of a document placed between the document feed unit 250 and a platen glass 211. In this case, the reader unit 200 turns on the lamp 212, and moves the optical unit 213. The reflection light from the document in this case is guided to the CCD image sensor (hereinafter referred to as CCD) 218 by the mirrors 214, 215, and 216 and the lens 217. The image on the document is read by the CCD 218. The image data output from the CCD 218 undergoes a predetermined process, and then, is transferred to the control device 110.

In the printer unit 300, a laser driver 321 drives a laser emission unit 322. The laser driver 321 allows the laser emission unit 322 to emit laser light according to the image data output from the image memory 130 in the control device 110. This laser light is emitted to a photosensitive drum 323, whereby a latent image according to the laser light is formed on the photosensitive drum 323. A developer adheres to the portion on which the latent image is formed, of the photosensitive drum 323 by a developing device 324.

The printer unit 300 includes the cassettes 311 to 314 of a drawer type, and the manual feed tray 315, as the sheet feed unit 310. Each of the cassettes 311 to 314 includes a sensor 380 for detecting whether a sheet is set in the corresponding cassette. The manual feed tray 315 also includes a sensor 390 for detecting whether a sheet is set on the manual feed tray 315.

The printer unit 300 feeds a sheet from any one of the cassettes 311 to 314 and the manual feed tray 315, and conveys this sheet to a transfer unit 325 via a conveyance path 331. The transfer unit 325 transfers the developer adhering to the photosensitive drum 323 onto the sheet.

The sheet having the developer transferred thereon is conveyed to a fixing unit 327 by a conveyance belt 326. The fixing unit 327 fixes the developer onto the sheet with heat and pressure. Thereafter, the sheet having passed through the fixing unit 327 is discharged through a conveyance path 335 and a conveyance path 334. When a sheet is discharged with its printed surface upside down, the sheet is guided to a conveyance path 338 through a conveyance path 336. The sheet is conveyed in the opposite direction from the conveyance path 338, and can be conveyed through a conveyance path 337 and the conveyance path 334.

When two-sided printing is designated, the sheet passes through the fixing unit 327, and then, is guided to a conveyance path 333 by a flapper 329 through the conveyance path 336. Thereafter, the sheet is conveyed in the opposite direction, and guided to the conveyance path 338 by the flapper 329. Then, the sheet is guided to a re-feed conveyance path 332. The sheet conveyed to the re-feed conveyance path 332 passes through a conveyance path 331 on the timing described above to be conveyed to the transfer unit 325, and the developer is transferred onto a second surface of the sheet by the transfer unit 325. Then, the sheet is guided to the conveyance path 334 via the fixing unit 327.

The sheet conveyed through the conveyance path 334 is conveyed to the finisher unit 500, regardless of whether a print mode is a one-sided printing or a two-sided printing.

The conveyed sheet is firstly sent to a buffer unit 501. In the present exemplary embodiment, the conveyed sheet is buffered around a buffer roller, according to circumstances. For example, when a process performed at the downstream side of the buffer unit 501, such as a stapling process, takes much time, a conveyance interval of sheets conveyed from an apparatus body can be adjusted with the buffer unit.

The sheet passes through a conveyance path 504 by a pair of upstream discharge rollers 502 and a pair of downstream discharge rollers 503, and is stacked onto a stack tray 505. After a sheet bundle of one copy is stacked on the stack tray 505, the stacked sheet bundle is discharged onto a sheet discharge tray 507.

When a shift is designated, the sheet bundle stacked on the stack tray 505 is shifted relative to the sheet bundle that is discharged just before this sheet bundle, and with this state, discharged onto the discharge tray 507. With this process, the user can easily find a break of each copy.

When the user instructs a stapling process to the sheet bundle, a staple unit 506 performs the stapling process to the sheet bundle that is conveyed on the conveyance path 504 by the pair of upstream discharge rollers 502 and the pair of downstream discharge rollers 503 and stacked onto a stack tray 505. The stapled sheet bundle is discharged onto the discharge tray 507 by the pair of downstream discharge rollers 503.

Figure 3:
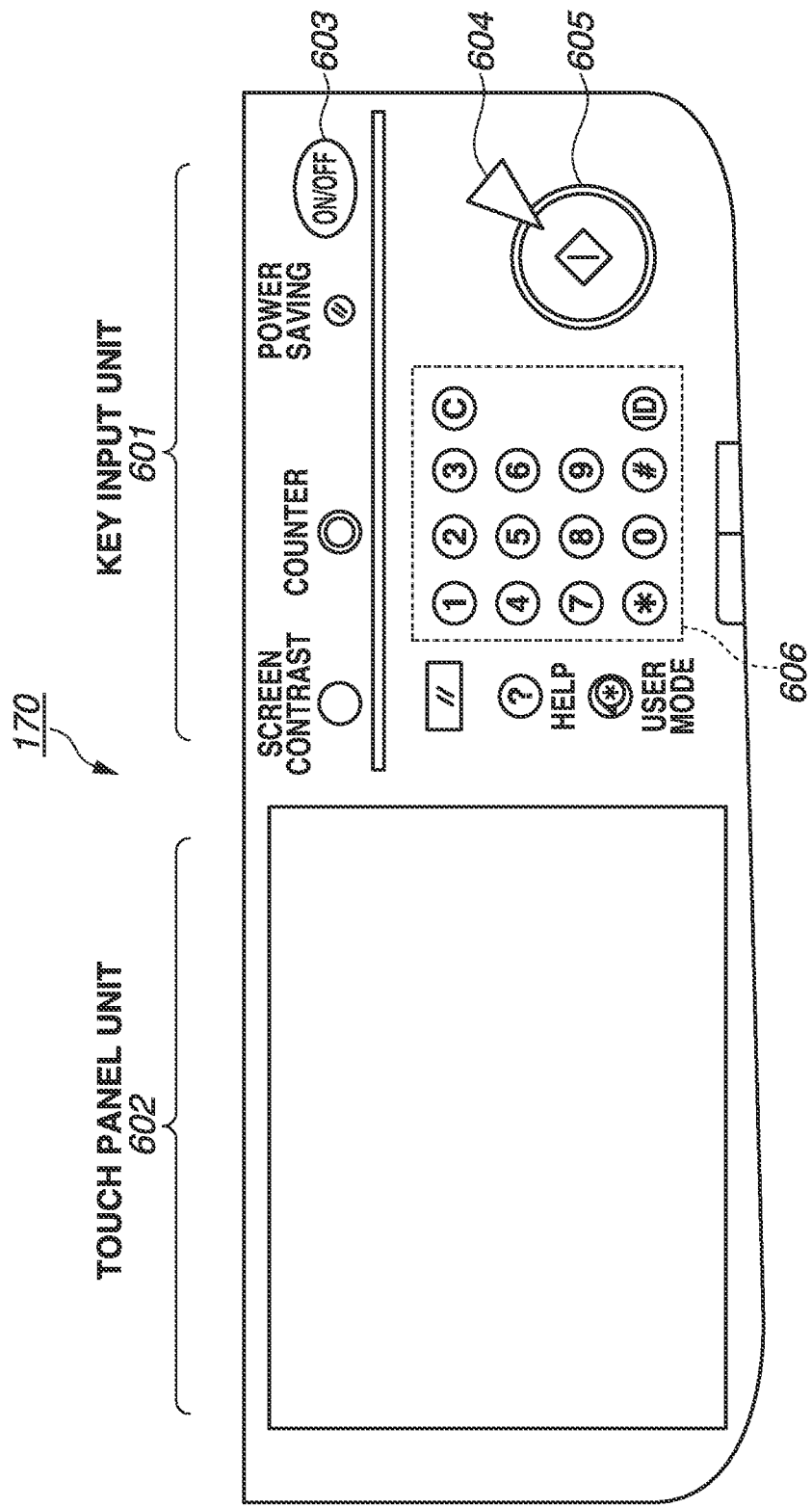
FIG. 3 is a view illustrating an operation unit according to the exemplary embodiment.

Next, the operation unit 170 provided in the MFP 100 illustrated in FIG. 1, will be described with reference to FIG. 3.

The operation unit 170 includes a key input unit 601 that receives a user operation performed with hard keys, and a touch panel unit 602 that can display soft keys (display keys) and receives a user operation performed with the soft keys.

The key input unit 601 will firstly be described. As illustrated in FIG. 3, the key input unit 601 includes an operation-unit power supply switch 603. When the user presses the operation-unit power supply switch 603 during a stand-by mode (normal operation state) of the MFP 100, the CPU 120 changes the MFP 100 into a sleep mode (the state in which power consumption is saved) from the stand-by mode. On the other hand, when the user presses the operation-unit power supply switch 603 during the sleep mode of the MFP 100, the CPU 120 changes the MFP 100 into the stand-by mode from the sleep mode.

A start key 605 receives, from the user, an instruction to allow the MFP 100 to execute a copying operation or data transmission.

A stop key 604 receives, from the user, an instruction to interrupt the copying operation or the data transmission.

A numeric keypad 606 is used for the user to make various settings of register number.

Next, the touch panel unit 602 will be described. The touch panel unit 602 includes a liquid crystal display (LCD) and a touch panel sheet including a transparent electrode adhering thereto. The touch panel unit 602 has a function of receiving various settings from the user and a function of presenting information to the user.

The MFP 100 having the above configuration can execute a plurality of types of jobs.

For example, the MFP 100 executes a copying job of reading an image of a document by the reader unit 200, generating image data indicating the read image of the document, and printing the image onto a sheet based on the image data and the setting received via the operation unit 170.

The MFP 100 also executes a printing job of analyzing print data received from the PC 111, generating image data based on the print setting received from the PC 111, and printing the image onto a sheet based on the generated image data.

The MFP 100 also executes a facsimile printing job of receiving code data from an external facsimile device through a phone line, converting the received code data into image data, and printing the image onto a sheet based on the converted image data.

The MFP 100 described above executes the plurality of types of jobs. However, the present invention is not limited thereto. The MFP 100 may only execute some jobs out of these types of jobs.

The MFP 100 can print an image onto an envelope. The user sets an envelope onto the manual feed tray 315, and makes a setting of the envelope by using the operation unit 170 to allow the MFP 100 to execute the copying job or the printing job. Thus, the user can allow the MFP 100 to print an image onto the envelope.

An example of control from when the user sets an envelope onto the manual feed tray 315 till the user executes a printing operation will be described below.

Figure 4:
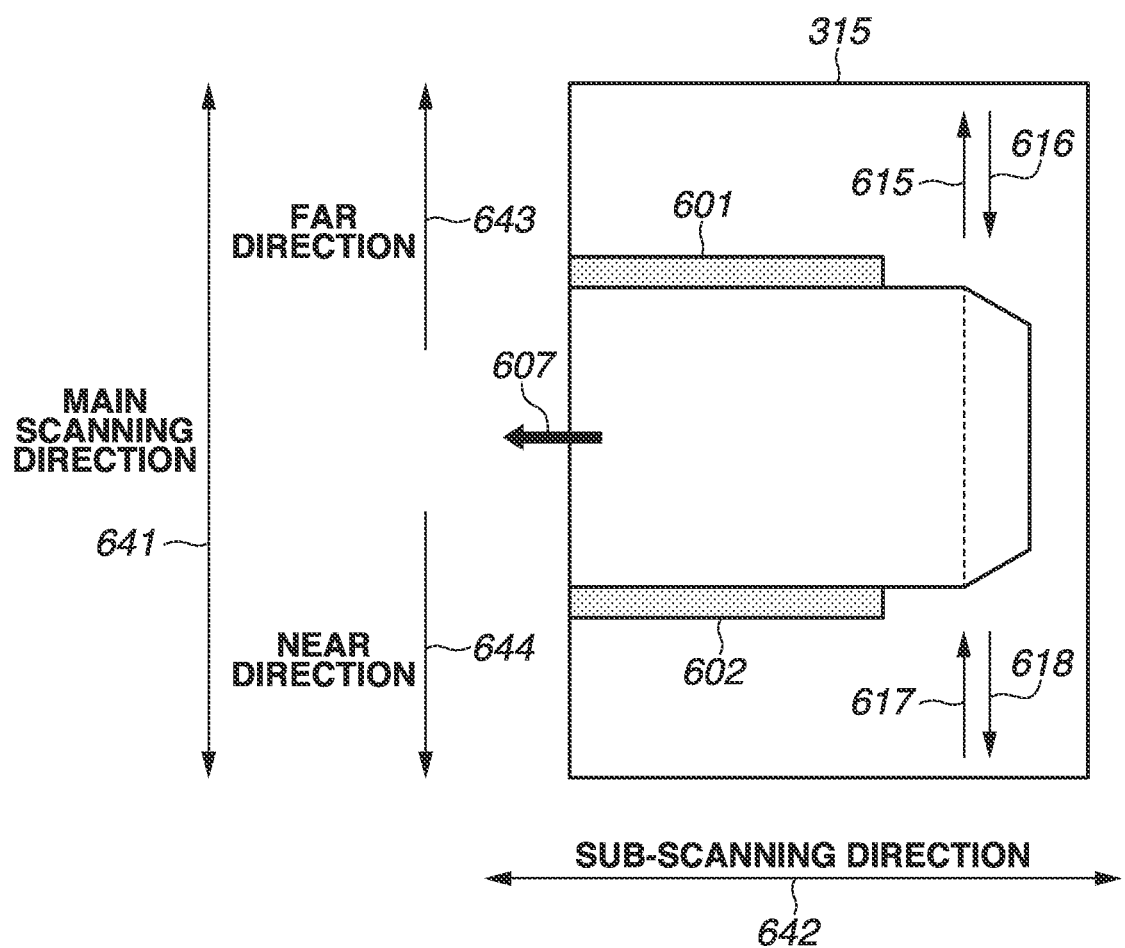
FIG. 4 is a view illustrating a manual feed tray according to the exemplary embodiment.

FIG. 4 is a view when the manual feed tray 315 is viewed from top. A conveyance direction 607 indicates a direction in which a sheet placed onto the manual feed tray 315 is fed by the printer unit 300 of the MFP 100 during the printing operation. A direction 641 indicates a main scanning direction, while a direction 642 indicates a sub-scanning direction. In the present exemplary embodiment, a direction that is a far side when the user stands in front of the MFP 100 (at the near side of the MFP 100 in FIG. 2) is defined as a far direction 643, while a direction that is a near side is defined as a near direction 644.

In FIG. 4, an envelope is set on the manual feed tray 315 with its flap opened. The user moves a guide 601 of the manual feed tray 315 in the far direction 615 or in the near direction 616 to bring the guide 601 into contact with an upper end of the envelope set on the manual feed tray 315. In this case, a guide 602 also moves together with the guide 601.

The envelope set on the manual feed tray 315 is fixed by the guide 601 and the guide 602 that move in conjunction with each other as described above, whereby a skew of the envelope can be prevented when feeding the envelope.

Figure 5:
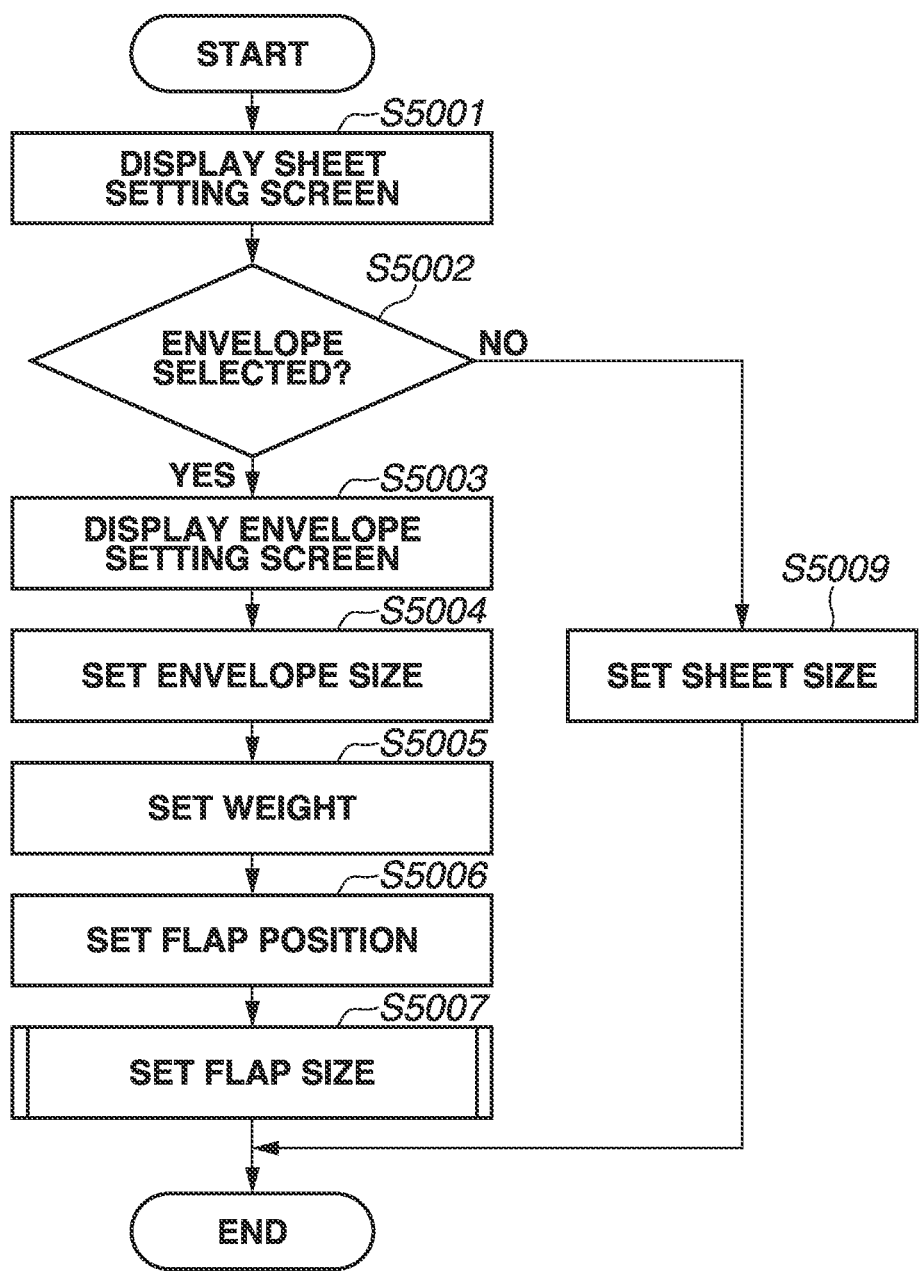
FIG. 5 is a flowchart illustrating a process according to a first exemplary embodiment.

When it is detected that the sheet is set on the manual feed tray 315, by the sensor 390 illustrated in FIG. 1, the CPU 120 starts a process illustrated in a flowchart of FIG. 5. Each process in the flowchart in FIG. 5 is realized by the CPU 120 executing a program stored in the ROM 160.

Figure 7:
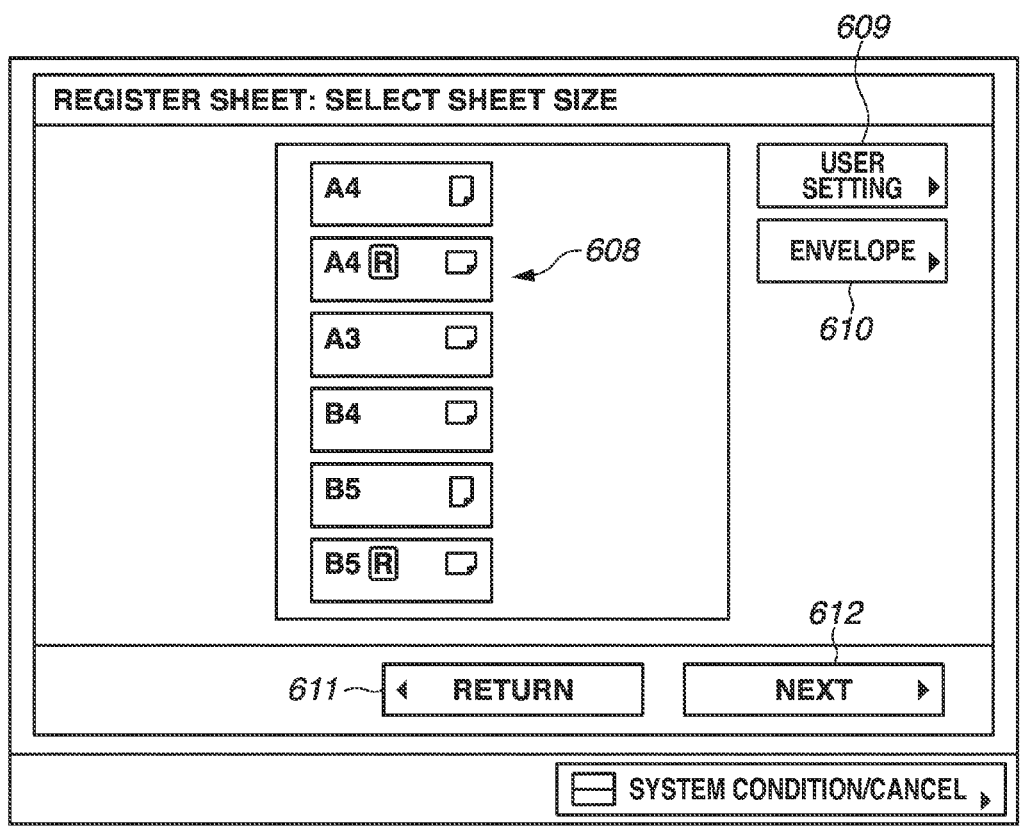
FIG. 7 is a view illustrating an operation screen according to the first exemplary embodiment.

In step S5001 in FIG. 5, the CPU 120 displays a sheet setting screen illustrated in FIG. 7 on the operation unit 170.

The user selects one of the sizes of the sheet set on the manual feed tray 315 on the screen illustrated in FIG. 7. A regular size button 608 is pressed when the user sets a sheet of a regular size such as A4 size or B5 size on the manual feed tray 315. A user setting button 609 is pressed when the user sets a sheet of an irregular size on the manual feed tray 315. When pressing the user setting button 609, the user sets a length and width of the sheet set on the manual feed tray 315. An envelope button 610 is pressed when the user sets an envelope on the manual feed tray 315.

In step S5002, the CPU 120 determines whether the envelope button 610 is pressed. When it is determined that the envelope button 610 is pressed (YES in step S5002), the CPU 120 moves the process to step S5003. When the regular size button 608 or the user setting button 609 is pressed (NO in step S5002), the CPU 120 moves the process to step S5009. In step S5009, when the regular size button 608 is pressed, the CPU 120 stores the size indicated by the pressed regular size button 608 into the RAM 150 as the size of the sheet set on the manual feed tray 315, and then, ends the process. On the other hand, when the user setting button 609 is pressed, the CPU 120 stores the length and width of the sheet set by the user into the RAM 150 as the size of the sheet set on the manual feed tray 315, and then, ends the process. The size stored in the RAM 150 is used for printing an image by the printer unit 300.

On the other hand, when moving the process to step S5003 as a result of the determination that the envelope button 610 is pressed (YES in step S5002), the CPU 120 displays the screen in FIG. 8 on the operation unit 170.

In step S5004 to step S5006, the CPU 120 sets size of an envelope, its weight, and its flap position. The user sets the envelope set on the manual feed tray 315 through the screen illustrated in FIG. 8.

Regions 1001 and 1002 in FIG. 8 receive an envelope size from the user. The region 1001 is a longitudinal length of the envelope when a flap of the envelope is defined as a top, and the region 1002 is a lateral length of the envelope when the flap of the envelope is defined as a top. The user touches the region 1001, and inputs numerical numbers indicating the longitudinal length of the envelope by using the numeric keypad 606. The user also touches the region 1002, and inputs numerical numbers indicating the lateral length of the envelope by using the numeric keypad 606. The CPU 120 stores the received numerical numbers as the longitudinal length and the lateral length of the envelope into the RAM 150.

A region 1003 is a region receiving a weight of an envelope from the user. The user touches the region 1003, and inputs numerical numbers indicating the weight of the envelope by using the numeric keypad 606. The CPU 120 stores the received numerical numbers into the RAM 150 as the weight of the envelope. The set weight is used for determining the temperature of the fixing unit 327 upon printing an image onto the envelope, or a conveyance speed of the envelope.

Figure 10:
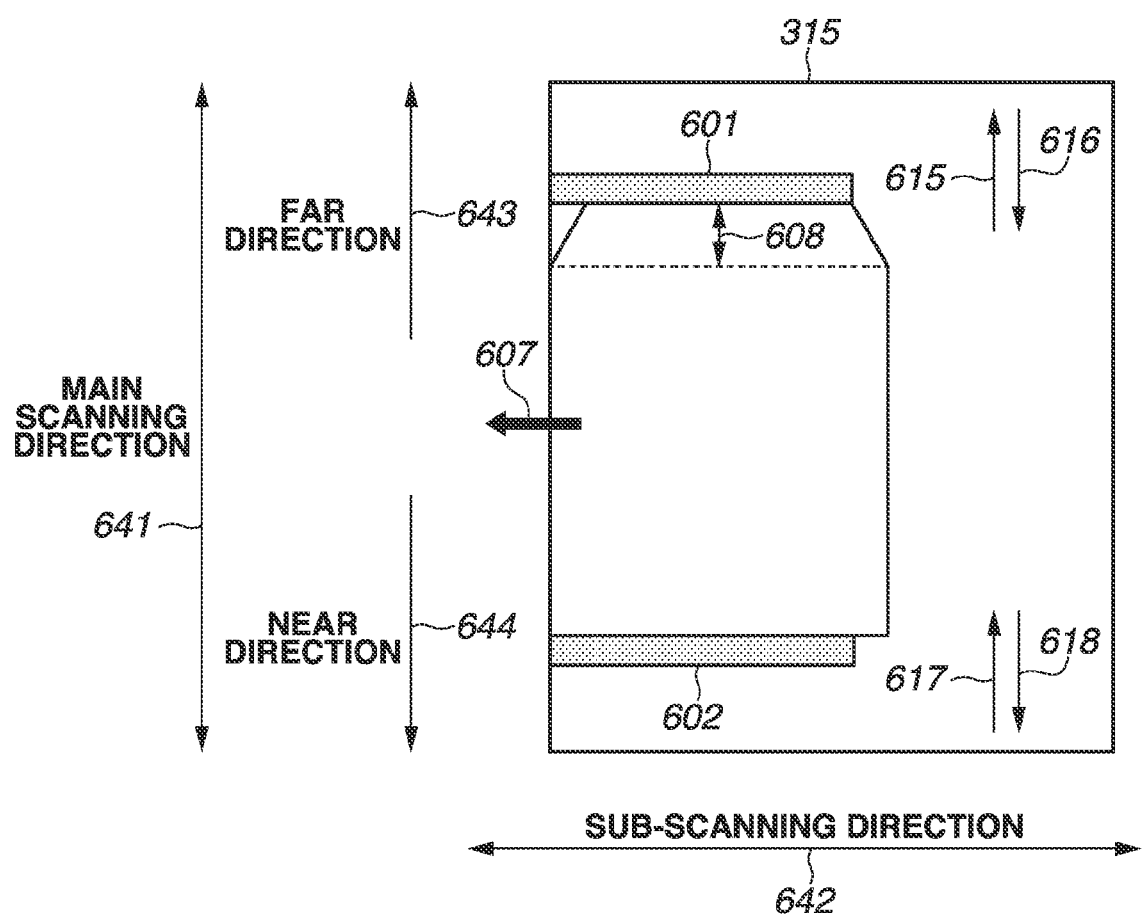
FIG. 10 is a view illustrating a manual feed tray according to the exemplary embodiment.

A front button 1004, a far button 1005, and a back button 1006 are buttons for receiving a position of a flap of an envelope set on the manual feed tray 315. The front button 1004 is pressed when an envelope is set on the manual feed tray 315 with the flap of the envelope being located on a front end in the conveyance direction, and this button is used when an envelope is set with its flap closed. The far button 1005 is pressed when an envelope is set on the manual feed tray 315 with the flap of the envelope being located at the far side as illustrated in FIG. 10. The back button 1006 is pressed when an envelope is set on the manual feed tray 315 with the flap of the envelope being located on the back end in the conveyance direction, and this button is used when an envelope is set with its flap closed.

A cancel button 1020 returns the display to the screen illustrated in FIG. 5 without reflecting the received setting made through the screen illustrated in FIG. 8. A next button 1021 determines the received setting made through the screen illustrated in FIG. 8, and changes the display to a next screen. The received setting is used for the printing operation by the printer unit 300, and stored in the RAM 150 as information of the envelope set on the manual feed tray 315 until the printing operation is ended.

Here, the example of receiving a setting in the order of step S5004, step S5005, and step S5006 has been described. However, the order of receiving the setting is not limited thereto. The user can set size and weight of an envelope and a flap position in any order.

After the processes in step S5004 to step S5006 are ended and the next button 1011 is pressed, the CPU 120 moves the process to step S5007 to set a flap size.

The process in step S5007 will be described with reference to FIG. 6.

In step S5011, the CPU 120 firstly determines whether the flap position received in step S5006 is a far side. When it is determined that the flap position is the front end or the back end in the conveyance direction (NO in step S5011), the CPU 120 moves the process to step S5012. When it is determined that the flap position is the far side (YES in step S5002), the CPU 120 moves the process to step S5014.

When moving the process to step S5012, the CPU 120 determines the flap size of the envelope as 0 mm, and in step S5013, the CPU 120 stores 0 mm into the RAM 150 as the flap size of the envelope. Then, the CPU 120 ends the setting process of the envelope.

Figure 9:
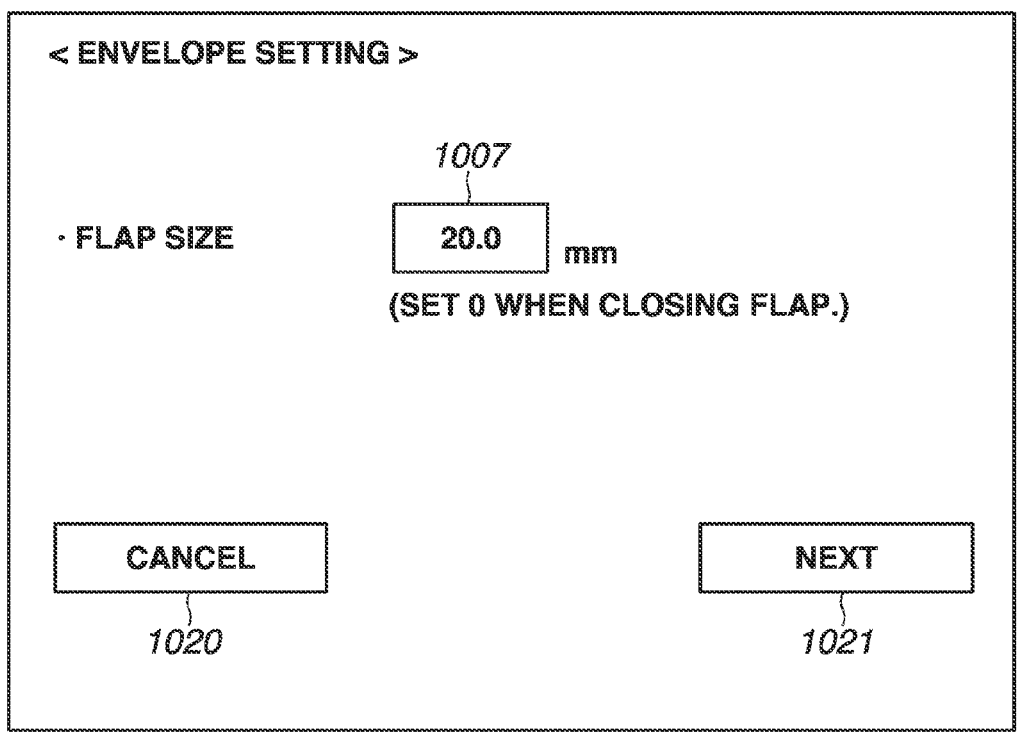
FIG. 9 is a view illustrating the operation screen according to the first exemplary embodiment.

On the other hand, when moving the process to step S5014, the CPU 120 displays a screen illustrated in FIG. 9, for setting the flap size of the envelope on the operation unit 170. A region 1007 in the screen illustrated in FIG. 9 is a region receiving a flap size of an envelope. The user touches the region 1007, and inputs numerical numbers indicating the flap size of the envelope by using the numeric keypad 606. In step S5015, the CPU 120 receives the numerical numbers input by the user which indicates the flap size. When the next key 1021 is pressed, the CPU 120 stores the received numerical numbers into the RAM 150 as the flap size of the envelope in step S5016, and then, ends the envelope setting process. When the cancel key 1020 is pressed, the received numerical numbers are canceled, and the CPU 120 displays the screen illustrated in FIG. 8 on the operation unit 170.

The reason why the CPU 120 allows the user to input a flap size of an envelope only when the flap position is on the far side will be described. When the flap position is on the far side, the envelope is set on the manual feed tray 315 as illustrated in FIG. 10. In this case, an image might be printed on the flap, if the image is printed without being shifted by a length 608 of the envelope. Therefore, when the envelope is set with its flap on the far side, the CPU 120 allows the user to set the flap size in the region 1007 in the screen illustrated in FIG. 9 to specify the length by which the image has to be shifted.

On the other hand, when the flap position is located on the front end in the conveyance direction, the envelope is set with its flap closed. Therefore, it is unnecessary to shift an image to be printed on the envelope. Accordingly, the flap size of the envelope is determined as 0 mm. When the flap position is located on the back end in the conveyance direction, the envelope is set with its flap opened, but it is unnecessary to shift an image to be printed on the envelope. Accordingly, the flap size of the envelope is determined as 0 mm.

Figure 11:
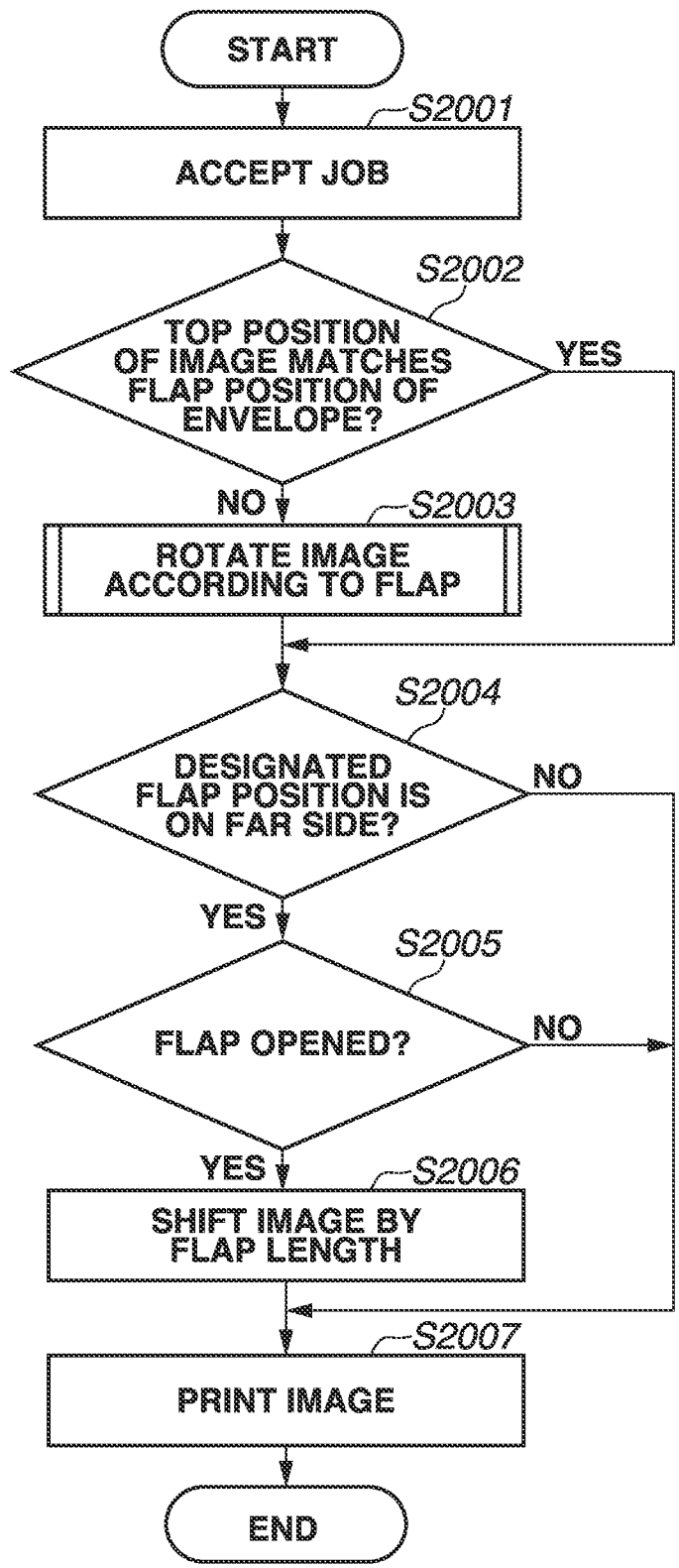
FIG. 11 is a flowchart illustrating a process according to the first exemplary embodiment.

Control for allowing the MFP 100 to print an image on an envelope after the envelope setting described above is set will be described next with reference to FIG. 11. Each process in a flowchart in FIG. 11 is realized by the CPU 120 executing a program stored in the ROM 160.

In step S2001, the CPU 120 receives a job. The above-mentioned printing job will be given as an example of the job. The CPU 120 analyzes the printing job, and executes the printing job, thereby storing an image to be printed into the image memory 130. The CPU 120 also stores the print setting set in the printing job into the RAM 150.

In step S2002, the CPU 120 determines whether the top position of the image to be printed matches the top position of the envelope by executing the printing job. Information indicating the top position of the image to be printed is designated by application software or printer driver in the PC 111, and applied to the print setting. On the other hand, the top position of the envelope is the same as the flap position designated in step S5006. When it is determined that the top position of the image to be printed does not match the designated top position of the envelope (NO in step S2002), the CPU 120 moves the process to step S2003 to rotate the image. On the other hand, when it is determined that the top position of the image to be printed matches the designated top position of the envelope (YES in step S2002), the CPU 120 skips step S2003, and moves the process to step S2004, since it is unnecessary to rotate the image. In general, the top position of the image is designated such that the far direction 643 of the manual feed tray 315 becomes the top position of the image, in the print setting. Therefore, in the present exemplary embodiment, the case where the top position of the image is designated such that the far direction 643 of the manual feed tray 315 becomes the top position, as an example. When the top position of the image is designated such that the far direction 643 of the manual feed tray 315 becomes the top position in the print setting, in step S2002, the CPU 120 determines whether the designated flap position of the envelope is "far". When it is determined that the designated flap position is "far" (YES in step S2002), the CPU 120 determines that there is no need to rotate the image, and then, moves the process to step S2004. On the other hand, when it is determined that the designated flap position is not "far" (NO in step S2002), the CPU 120 moves the process to step S2003.

Figure 12:
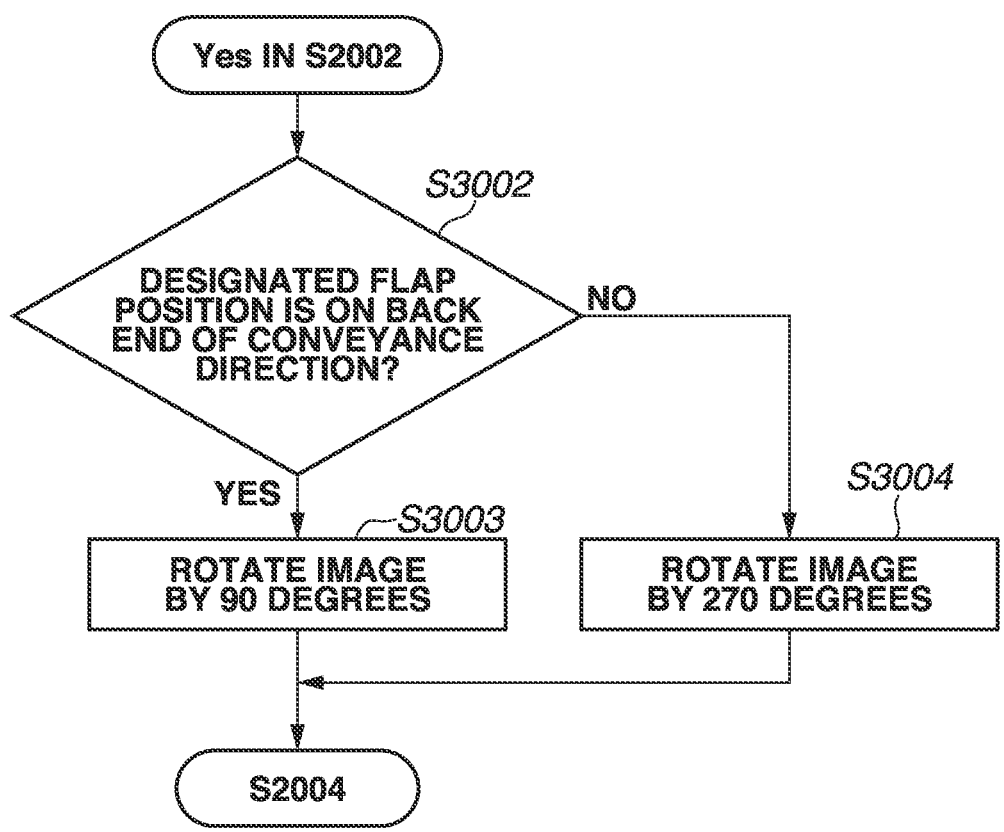
FIG. 12 is a flowchart illustrating a process according to a second exemplary embodiment.

The detail of step S2003 will be described here with reference to FIG. 12. A process in each step illustrated in FIG. 12 is executed by the CPU 120 reading and executing a program stored in the ROM 160.

In step S3002, the CPU 120 determines whether the designated flap position is "back end in the conveyance direction". When it is determined that the designated flap position is the "back end in the conveyance direction" (YES in step S3002), the CPU 120 moves the process to step S3003. When it is determined that the designated flap position is not the "back end in the conveyance direction", that is, the flap position is the "front end in the conveyance direction" (NO in step S3002), the CPU 120 moves the process to step S3004.

When moving the process to step S3003, the CPU 120 rotates the image by 90 degrees in a clockwise direction, and then, moves the process to step S2004 in FIG. 11.

When moving the process to step S3004, the CPU 120 rotates the image by 270 degrees in a clockwise direction, and then, moves the process to step S2004 in FIG. 11. The image may be rotated by 90 degrees in a counterclockwise direction.

Returning to FIG. 11, in step S2004, the CPU 120 determines whether the designated flap position is "far". When it is determined that the designated flap position is "far" (YES in step S2004), the CPU 120 moves the process to step S2005, and when it is determined that the designated flap position is not "far" (NO in step S2004), the CPU 120 moves the process to step S2007.

In step S2005, the CPU 120 determines whether the flap of the envelope set on the manual feed tray 315 is opened or closed. The CPU 120 determines here whether the flap of the envelope is opened or closed based on the flap size stored in the RAM 150. When the flap size stored in the RAM 150 is not 0 mm, the CPU 120 determines that the flap is opened (YES in step S2005). When the flap size is 0 mm, the CPU 120 determines that the flap is closed (NO in step S2005). When it is determined that the flap is opened (YES in step S2005), the CPU 120 moves the process to step S2006, and when it is determined that the flap is closed (NO in step S2005), the CPU 120 moves the process to step S2007 without executing the process in step S2006.

In step S2006, the CPU 120 shifts the image stored in the image memory 130 by the length of the designated flap. This shift is executed in order that the image is printed as being shifted by the designated length of the flap in the near direction 644 in FIG. 10.

In step S2007, the CPU 120 transmits the image stored in the image memory 130 to the printer unit 300, and instructs the printer unit 300 to print the image.

When receiving this instruction, the printer unit 300 feeds a sheet from the sheet feed unit 310, and prints the image with the marking unit 320 based on the image data stored in the image memory 130. The printer unit 300 discharges the sheet having the image printed thereon onto the sheet discharge unit 330.

According to the control described above, even when an image is printed on an envelope set on the manual feed tray 315 with its flap opened or on an envelope set on the manual feed tray 315 with its flap closed, the image can be printed on a right position of the envelope in a right direction. Therefore, the user does not need to open the flap of the envelope, which is sold with its flap closed, before setting this envelope on the manual feed tray 315.

In the first exemplary embodiment, a flap position is designated first, and then, a flap size is designated.

A second exemplary embodiment describes the case in which a flap size is designated first, and then, a flap position is designated. When a flap size is designated first, whether the flap size is 0 mm is also decided. Therefore, it is also determined whether the envelope is set on a manual feed tray 315 with its flap opened or closed.

When an image is printed on an envelope with its flap opened, the envelope is desirably set with its flap located at the back end in the conveyance direction to prevent the flap from being stuck during the conveyance of the envelope. On the other hand, when an image is printed on an envelope with its flap closed, the envelope is desirably set with its flap located on the front end in the conveyance direction.

In view of such a circumstance, the second exemplary embodiment describes the case in which the user can recognize the direction in which the envelope cannot be set, according to the open/close state of the flap designated beforehand. This process can reduce the possibility of the occurrence of a jam in a MFP 100 caused by the envelope set on the manual feed tray 315 in a wrong direction.

The configuration of the MFP 100 is similar to that in the first exemplary embodiment. Therefore, the redundant description will not be repeated, and only different points will be described.

Figure 13:
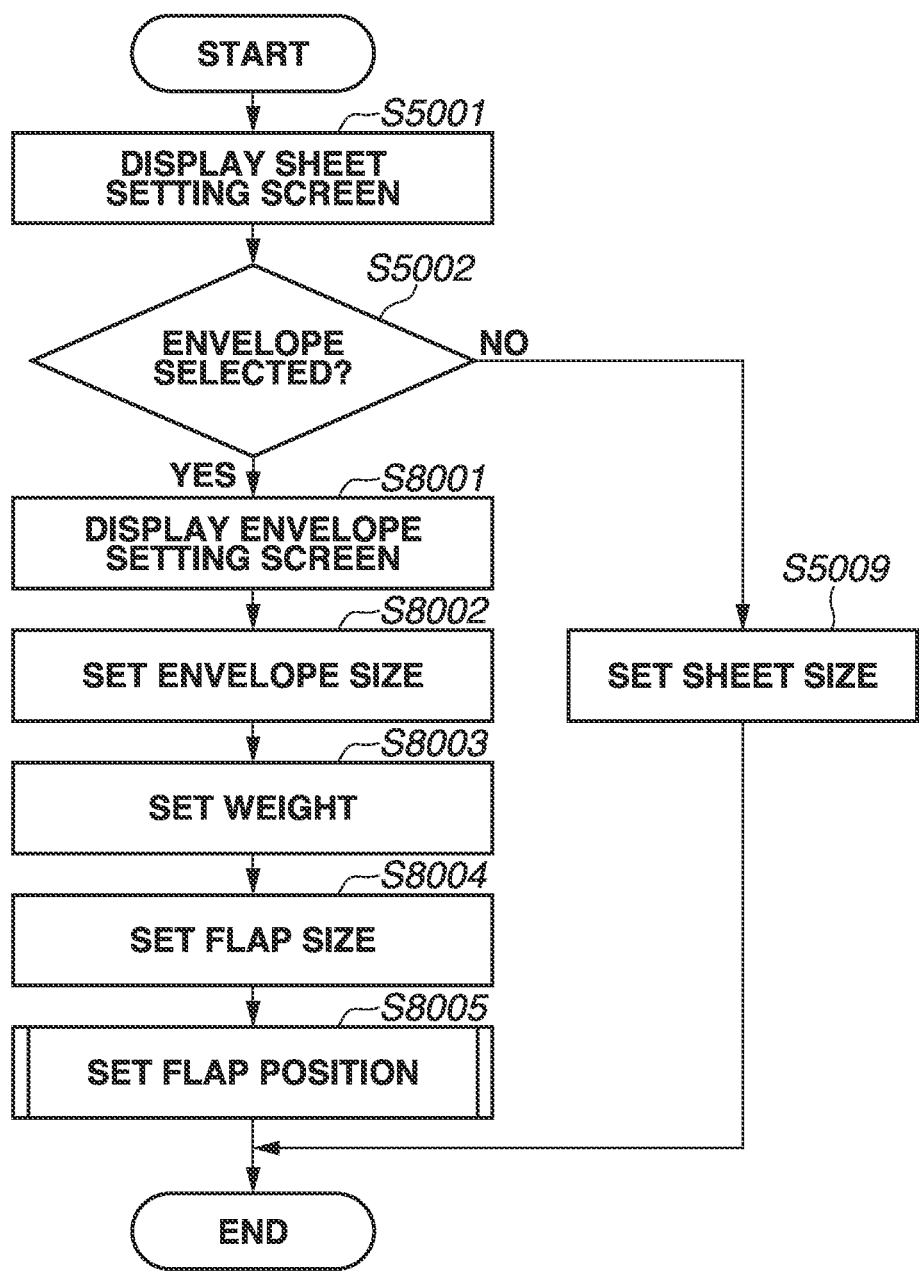
FIG. 13 is a flowchart illustrating the process according to the second exemplary embodiment.

In the second exemplary embodiment, a CPU 120 executes processes of a flowchart illustrated in FIG. 13, instead of the processes of the flowchart illustrated in FIG. 5, to make a setting of an envelope on the manual feed tray 315. The processes similar to those in FIG. 5 are identified by the same numerals. The different points from the flowchart in FIG. 5 are step S8001 to step S8005. Each process in the flowchart in FIG. 13 is executed by the CPU 120 reading and executing the program stored in a ROM 160.

Figure 6:
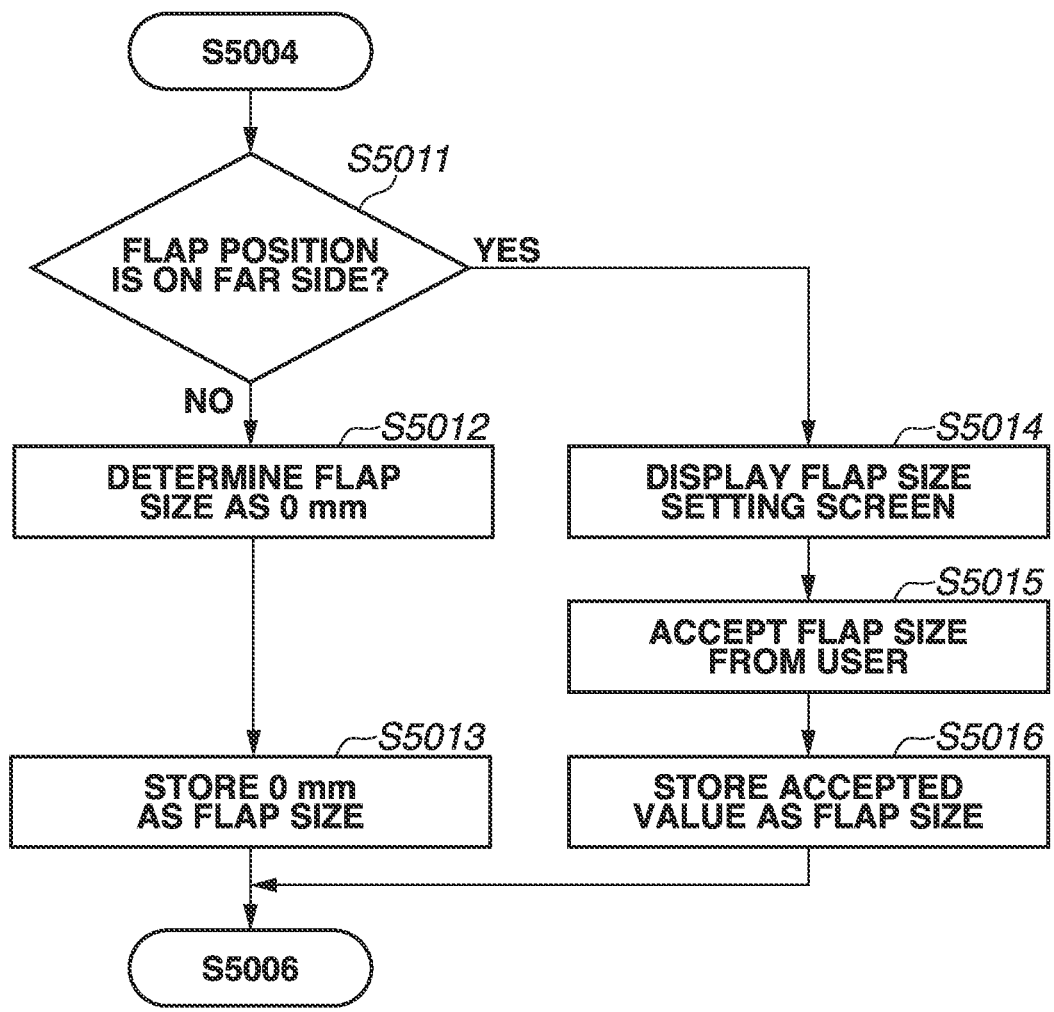
FIG. 6 is a flowchart illustrating the process according to the first exemplary embodiment.

In the second exemplary embodiment, when an envelope button 610 illustrated in FIG. 6 is pressed, the CPU 120 displays a screen illustrated in FIG. 15 on an operation unit 170 instead of the screen in FIG. 8 in step S8001.

Regions 1001 and 1002 for setting a size of an envelope and a region 1003 for setting a weight of the envelope are displayed on the operation screen illustrated in FIG. 15, similar to FIG. 8.

The screen illustrated in FIG. 15 is different from the screen in FIG. 8 in that the screen in FIG. 15 displays a region 4001 for designating a flap size, instead of the regions for setting a flap position. In step S8002 to step S8004, the CPU 120 receives a setting of a size of an envelope, a setting of a weight of an envelope, and a setting of a flap size of an envelope from a user. When the flap size of the envelope is set, the user touches the region 4001, and inputs numerical numbers indicating the flap size of the envelope by using a numeric keypad 606. The CPU 120 receives the numerical numbers indicating the flap size and input by the user. The CPU 120 then stores the received numerical numbers into a RAM 150 as the flap size of the envelope, and ends the envelope setting process.

Figure 14:
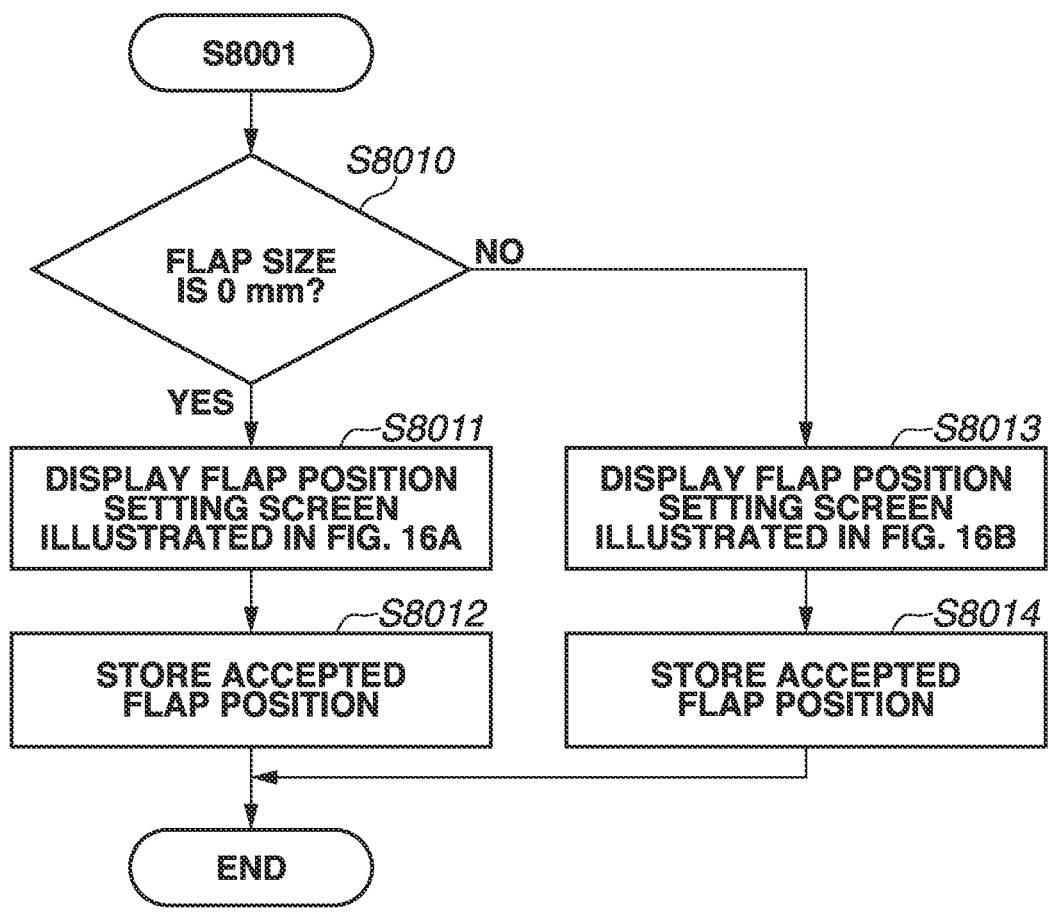
FIG. 14 is a flowchart illustrating the process according to the second exemplary embodiment.

When a next button 1011 is pressed, the CPU 120 moves the process to step S8005. The detail of the process in step S8005 will be described with reference to FIG. 14. Each process illustrated in FIG. 14 is executed by the CPU 120 reading and executing the program stored in the ROM 160.

In step S8010, the CPU 120 determines whether 0 mm is set as the flap size set in step S8004. When it is determined that 0 mm is set as the flap size (YES in step S8010), the CPU 120 moves the process to step S8011. When it is determined that a number other than 0 mm is set as the flap size (NO in step S8010), the CPU 120 moves the process to step S8013.

Figure 16A:
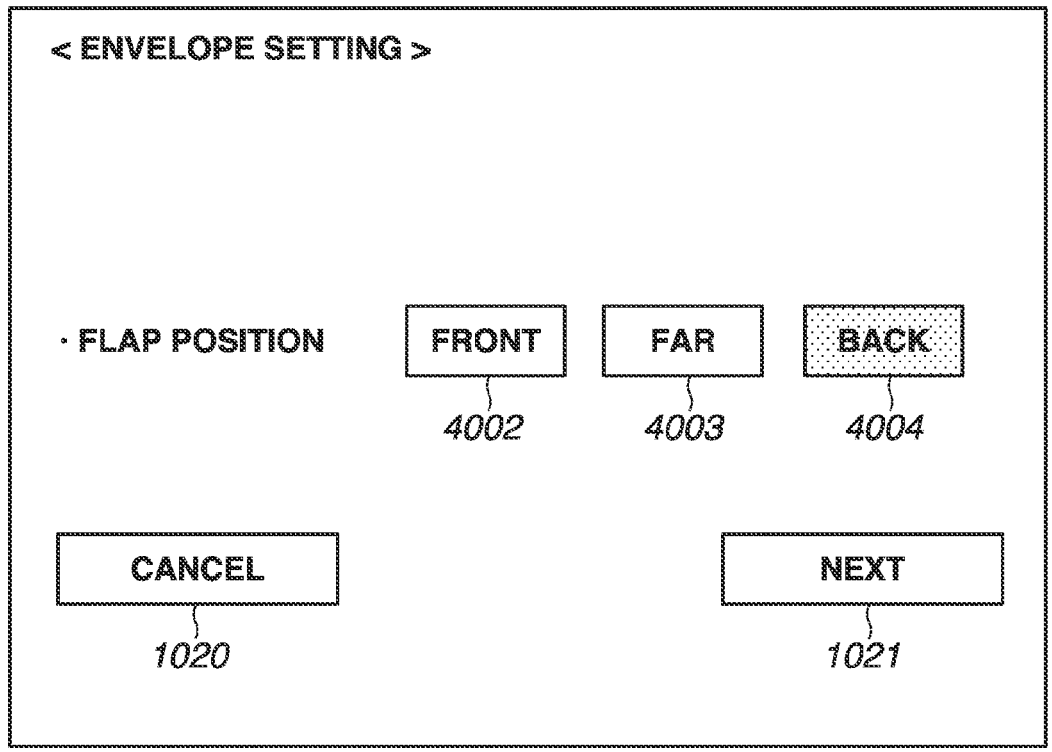
FIGS. 16A and 16B are views illustrating an operation screen according to the second exemplary embodiment.

In step S8011, the CPU 120 displays a flap position setting screen illustrated in FIG. 16A on the operation unit 170.

A front button 4002, a far button 4003, and a back button 4004 are displayed on the screen illustrated in FIG. 16A as buttons for designating a flap position. When the front end in the conveyance direction is selected by the front button 4002 and the far side is selected by the far button 4003 as the flap position of the envelope, the CPU 120 stores the respective positions into the RAM 150 as the flap position. On the other hand, even if the back end in the conveyance direction is selected by a back button 4004, the CPU 120 does not store the back end in the conveyance direction in the RAM 150 as the flap position. The screen illustrated in FIG. 16A displays the grayed-out back button 4004 to indicate that the user cannot select the back end in the conveyance direction as the flap position. Therefore, the user who sees the screen illustrated in FIG. 16A can easily recognize that the user cannot select the back end in the conveyance direction. Specifically, the user can easily understand that the user should not set an envelope with its flap located on the back end in the conveyance direction.

In step S8012, the CPU 120 stores the flap position received on the screen illustrated in FIG. 16A into the RAM 150 as the flap position of the envelope set on the manual feed tray 315, and then, ends the process.

Figure 16B:
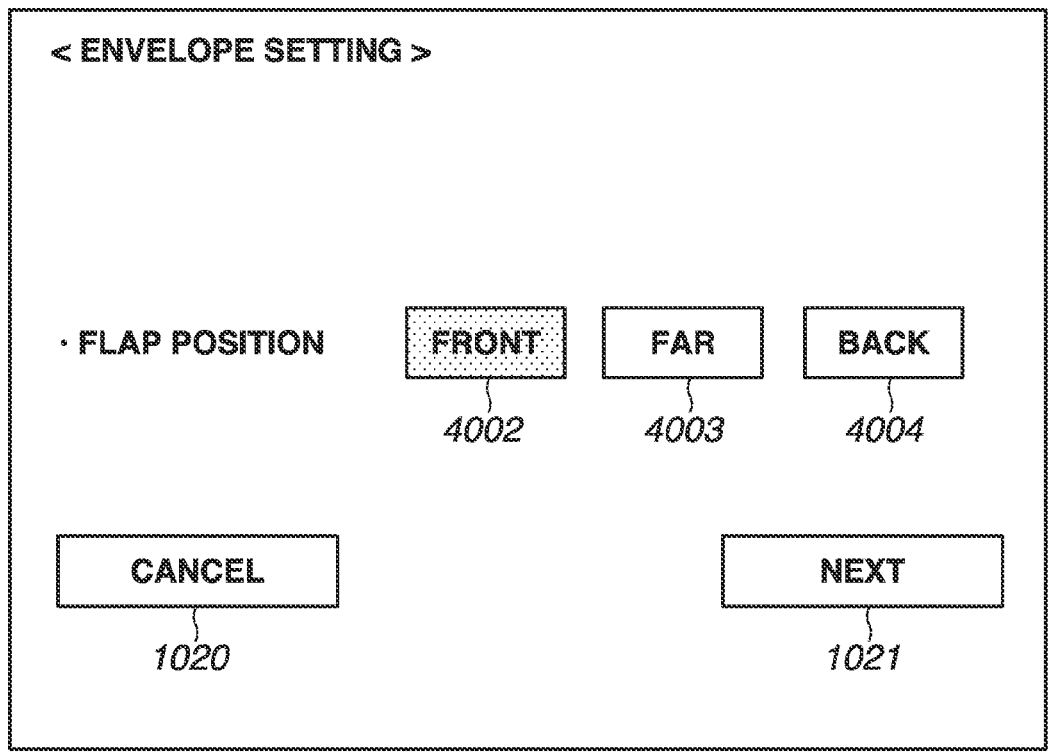
Figure 17A:
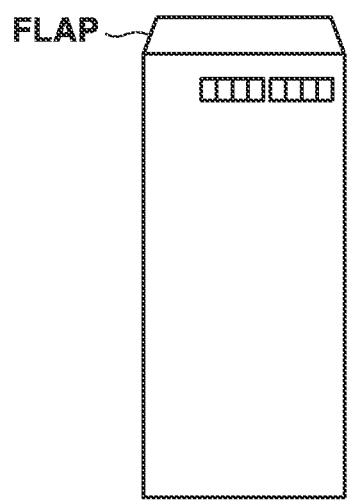
FIGS. 17A and 17B are views for describing an envelope and a conveyance direction of the envelope.
Figure 17B:

On the other hand, when moving the process to step S8013 from step S8010, the CPU 120 displays a flap position setting screen illustrated in FIG. 16B on the operation unit 170.

The front button 4002, the far button 4003, and the back button 4004 are displayed on the screen illustrated in FIG. 16B as buttons for designating a flap position. When the far side is selected by the far button 4003 and the back end in the conveyance direction is selected by the back button 4004 as the flap position of the envelope, the CPU 120 stores the respective positions into the RAM 150 as the flap position. On the other hand, even if the front end in the conveyance direction is selected by the front button 4002, the CPU 120 does not store the front end in the conveyance direction in the RAM 150 as the flap position. The screen illustrated in FIG. 16B displays the grayed-out front button 4002 to indicate that the user cannot select the front end in the conveyance direction as the flap position. Therefore, the user who sees the screen illustrated in FIG. 16B can easily recognize that the user cannot select the front end in the conveyance direction. Specifically, the user can easily understand that the user should not set an envelope with its flap located on the front end in the conveyance direction.

In step S8014, the CPU 120 stores the flap position received on the screen illustrated in FIG. 16B into the RAM 150 as the flap position of the envelope set on the manual feed tray 315, and then, ends the process.

The succeeding processes are similar to those in the first exemplary embodiment, so that the detailed description will not be repeated.

The control described above can reduce the possibility of an occurrence of a jam in the MFP 100 caused by an envelope set on the manual feed tray 315 in a wrong direction, when the user designates a flap size first.

In the present exemplary embodiment, the flap position that cannot be designated is presented to the user according to the open/close state of the flap designated first, whereby the user can recognize the direction of the envelope that should not be set when the envelope is set on the manual feed tray 315. However, the present invention is not limited thereto. The direction of the envelope that should not be set may be notified to the user as a message. Specifically, when a flap size of an envelope is not 0 mm and the envelope is set on the manual feed tray 315 with its flap opened, a message indicating that the envelope should not be set with its flap located on the front end in the conveyance direction may be displayed to allow the user to recognize this situation. Further, when a flap size of an envelope is 0 mm and the envelope is set on the manual feed tray 315 with its flap closed, a message indicating that the envelope should not be set with its flap located on the back end in the conveyance direction may be displayed to allow the user to recognize this situation.

Other Embodiments

In the above exemplary embodiments, when the size of the flap set by the user and stored in the RAM 150 in step S2005 is not 0 mm, the CPU determines that the flap is opened, and when the size of the flap is 0 mm, the CPU determines that the flap is opened. However, the present invention is not limited thereto. For example, the user may determine whether to set the envelope with its flap closed or with its flap opened. In this case, the CPU 120 may receive the size of the flap from the user via the operation unit 170 only when the flap is set to be opened.

In the above exemplary embodiments, the user designates the flap position as a front end, a far side, or a back end in the conveyance direction. However, the flap position may be otherwise designated. For example, a near side rotated 180 degrees from the far side may be designated as the flap position, in addition to the front end, the far side, and the back end in the conveyance direction. When the user designates the near side, the MFP 100 may perform control such that an image whose far side is the top, is rotated 180 degrees, regardless of the open/close state of the flap, and the resultant image is printed.

The above exemplary embodiments describe that an envelope is set on the manual feed tray 315 and an image is printed on the envelope. However, the present invention may be applied to an apparatus that feeds an envelope from any one of cassettes 311 to 314 and an image is printed on this envelope. In this case, the user needs to set an envelope in any cassettes 311 to 314 with its printing surface facing the bottom of the corresponding cassette, different from the case where the envelope is set on the manual feed tray 315.

In the above first and second exemplary embodiments, the setting screen of an envelope is displayed through the operation unit 170, and control is performed to receive the setting of the envelope from the user. However, the present invention is not limited thereto. The MFP 100 may perform control to display the above various setting screens onto the display unit of a PC 111, and the MFP 100 may receive and control the setting received from the user through the operation unit of the PC 111. Alternatively, the CPU of the PC 111 may independently display the various setting screens and receive the setting.

According to the above exemplary embodiments, the printing job is executed. However, the present invention may be applied to a copying job and a facsimile printing job.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-153614 filed Jul. 24, 2013, which is hereby incorporated by reference herein in its entirety.

What is claimed is:

1. A printing apparatus comprising:
a holding unit configured to hold an envelope having a flap;
a receiving unit configured to receive, from a user, a position of the flap of the envelope held by the holding unit; and
a control unit configured to perform control such that an image is printed on the envelope in a first direction when the position received by the receiving unit indicates a front end of the envelope in a conveyance direction, to perform control such that the image is printed on the envelope in a second direction which is opposite to the first direction when the position received by the receiving unit indicates a back end of the envelope in the conveyance direction, and to perform control such that the image is printed on the envelope in a third direction different from the first direction and the second direction when the position received by the receiving unit indicates a far end from a user.

2. The printing apparatus according to claim 1, wherein the holding unit is a manual feed tray.

3. The printing apparatus according to claim 1, further comprising a determining unit configured to determine whether the holding unit holds the envelope with its flap opened or the holding unit holds the envelope with its flap closed.

4. The printing apparatus according to claim 3, further comprising:
a setting unit configured to set a size of the flap,
wherein the determining unit determines whether the envelope is held with its flap opened or the envelope is held with its flap closed, depending upon whether the size of the flap set by the setting unit is 0.

5. The printing apparatus according to claim 3, further comprising:
a receiving control unit configured to perform control such that the receiving unit does not receive the position indicating the front end when the determining unit determines that the envelope is held with its flap opened, and to perform control such that the receiving unit does not receive the position indicating the back end when the determining unit determines that the envelope is held with its flap closed.

6. A control method for controlling a printing apparatus having a holding unit configured to hold an envelope having a flap, comprising:
receiving, from a user, a position of the flap of the envelope held by the holding unit;
performing control such that an image is printed on the envelope in a first direction when the received position indicates a front end of the envelope in a conveyance direction,
performing control such that the image is printed on the envelope in a second direction which is opposite to the first direction when the received position indicates a back end of the envelope in the conveyance direction, and
performing control such that the image is printed on the envelope in a third direction different from the first direction and the second direction when the position received indicates a far end from a user.

7. A non-transitory computer readable storage medium for storing a computer program for controlling a printing apparatus having a holding unit configured to hold an envelope having a flap, the computer program comprising:
a code to receive, from a user, a position of the flap of the envelope held by the holding unit; and
a code to perform control such that an image is printed on the envelope in a first direction when the received position indicates a front end of the envelope in a conveyance direction, to perform control such that the image is printed on the envelope in a second direction which is opposite to the first direction when the received position indicates a back end of the envelope in the conveyance direction, and to perform control such that the image is printed on the envelope in a third direction different from the first direction and the second direction when the position received indicates a far end from a user.

* * * * *